United States Patent [19]

Gue

[11] Patent Number: 4,484,721

[45] Date of Patent: Nov. 27, 1984

[54] WATERPLANES EMPLOYING A HYDROFOIL STRUCTURE AS LANDING GEAR

[76] Inventor: Frank S. Gue, 2252 Joyce St., Burlington, Ontario, Canada, L7R 2B5

[21] Appl. No.: 457,336

[22] Filed: Jan. 12, 1983

[51] Int. Cl.³ .................... B64C 25/00; B64C 35/00
[52] U.S. Cl. ....................................... 244/105; 44/274
[58] Field of Search .............. 244/101, 105, 106, 107; 114/271, 272, 274

[56] References Cited

U.S. PATENT DOCUMENTS

| | | | |
|---|---|---|---|
| 1,170,965 | 2/1916 | Curtiss | 244/106 |
| 1,246,016 | 11/1917 | Curtiss | 244/106 |
| 1,285,230 | 11/1918 | Kleckler et al. | 244/105 |
| 1,287,249 | 12/1918 | Curtiss | 244/106 |
| 1,295,084 | 2/1919 | Curtiss | 244/106 |
| 1,312,910 | 8/1919 | Janin | 244/106 |
| 1,329,336 | 1/1920 | Curtiss | 244/106 |
| 1,392,279 | 9/1921 | Kleckler | 244/106 |
| 1,394,630 | 10/1921 | Loening | 244/101 |
| 1,552,473 | 9/1925 | Dornier | 244/106 |
| 1,704,076 | 3/1929 | Carroll | 244/101 |
| 1,778,113 | 10/1930 | Loening | 244/101 |
| 1,790,894 | 2/1931 | Bellanca | 244/105 |
| 1,865,749 | 7/1932 | Fleet | 244/106 |
| 2,147,795 | 2/1939 | Martin | 244/106 |
| 2,767,678 | 10/1956 | Vertens | 114/274 |
| 2,942,810 | 6/1960 | Hanning-Lee et al. | 244/105 |
| 3,159,361 | 12/1964 | Weiland | 244/12 |
| 3,651,775 | 3/1972 | Kock | 114/274 |
| 3,693,570 | 9/1972 | Erlykin et al. | 114/274 |
| 3,738,598 | 6/1973 | Larkin | 244/105 |
| 3,966,143 | 6/1976 | Smith | 244/16 |
| 4,027,835 | 6/1977 | Sachs | 244/101 |
| 4,270,713 | 6/1981 | Dornier | 244/106 |

FOREIGN PATENT DOCUMENTS

| | | | |
|---|---|---|---|
| 1261960 | 4/1961 | France | 114/272 |
| 1268705 | 6/1961 | France | 114/274 |
| 320963 | 9/1934 | Italy | 244/105 |
| 318858 | 5/1930 | United Kingdom | 244/105 |
| 376634 | 7/1932 | United Kingdom | 244/105 |

Primary Examiner—Trygve M. Blix
Assistant Examiner—Rodney Corl
Attorney, Agent, or Firm—Hirons, Rogers & Scott

[57] ABSTRACT

This invention provides a new form of landing gear for a water plane that will minimize the time and power required to accelerate it from the at-rest, displacement-borne phase to the planing phase and takeoff phase of its operation. The landing gear of the invention is of hydrofoil type and separates the buoyant support function from the planing support function and recombines them in a way which causes them to interact, mutually assisting each other in all phases of operation, simultaneously providing a much lighter and stronger structure, having less drag and requiring less power input than devices and combinations heretofore used or proposed. Thus, the plane body is of any suitable water borne hull shape with two wings whose roots are submerged while floating to give transverse stability. The hydrofoil takes the form of a truss structure including the root portions of these wings and comprising two downwardly and inwardly inclined primary hydrofoils whose inner lower ends are spaced apart a distance wider than the plane body and connected together by a horizontal connector that may be another secondary hydrofoil. The truss is completed by two struts each connected at its upper end to the plane body and at its lower end to the junction of the respective primary hydrofoil and the horizontal connector. The submerged portion of the wings provide roll stability at rest, while the inclined primary hydrofoils provide such stability during acceleration to take-off speed.

6 Claims, 6 Drawing Figures

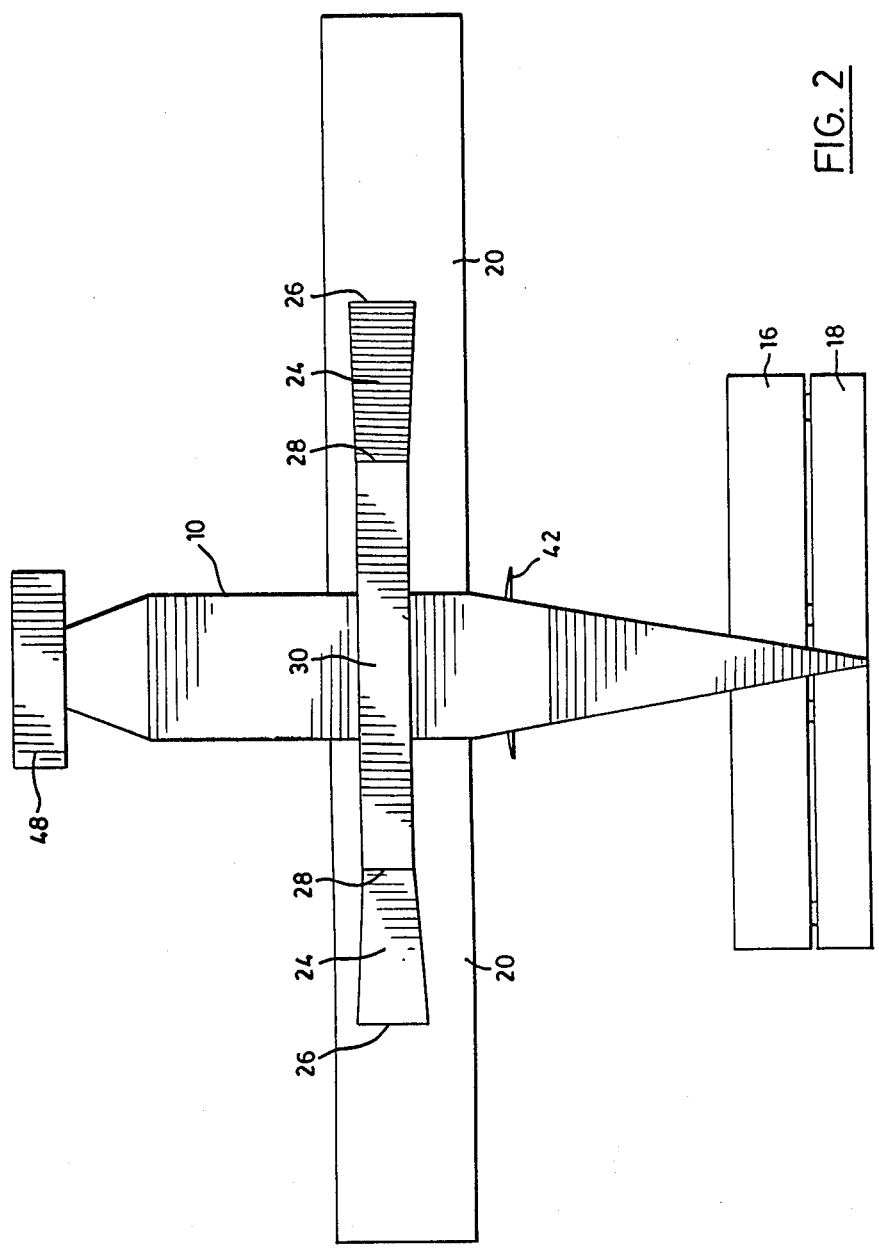

WATERPLANES EMPLOYING A HYDROFOIL STRUCTURE AS LANDING GEAR

FIELD OF THE INVENTION

The present invention is concerned with improvements in or relating to waterplanes employing a hydrofoil structure as landing gear.

REVIEW OF THE PRIOR ART

The invention was the subject of a prior novelty search among U.S. patent specifications in Class 114 (ships), sub-classes 272, 274 and 278, and in Class 244 (aeronautics), sub-classes 101, 105, 106 and 107, as the result of which the following were brought to the attention of the applicant: U.S. Pat. Nos. 1,170,965; 1,246,016; 1,285,230; 1,287,249; 1,295,084; 1,312,910; 1,329,336; 1,392,279; 1,394,630; 1,552,473; 1,778,113; 1,790,894; 1,865,749; 2,147,795; 2,942,810; 3,159,361; 3,738,598; 3,966,143; 4,027,835; 4,270,713.

U.S. Pat. No. 2,942,810 issued June 28, 1960 to F. E. and S. Hanning-Lee discloses a hydrofoil craft comprising an aircraft provided with a hydrofoil landing gear consisting of two hydrofoils extending downwards and inwards to form a V-shape beneath the aircraft hull, the hydrofoils being connected by struts to the hull and to the wings at about the midspan thereof. The structure is illustrated as mounted on a high-wing monoplane and it is specified as a requirement of the invention that the hydrofoils project below the water surface of the main supporting wing or wings. Distinctions between the present invention and the disclosure of this citation will also be discussed below.

A "waterplane" is defined in the World Book Encyclopedia Dictionary, 1966 Ed., P. 2207 as an airplane adapted for alighting on, ascending from, and traveling on the water; a seaplane. A waterplane is required to rest stably and safely on the water and also to accelerate stably, safely, and as quickly as possible to flying speed, using the least practical amount of power. The transition from buoyant support on the water to airborne support is always difficult, usually requiring more power than really is required for satisfactory airborne flight, with consequent increase in both first cost and operating expense. This requirement for extra "take-off" power is particularly onerous for ultra-light sporting aircraft which attempt to use the smallest possible engine or engines that will propel the craft.

In typical known waterplane structures stability at rest has been obtained by providing sufficient buoyancy to support the waterplane on the water with a margin of safety, and distributing this buoyancy along the longitudinal and pitch axes of the aircraft to obtain a desired at-rest attitude and resistance to rotation around these two axes. Typically these have been obtained by the use of two long transversely-spaced floats; or three shorter floats arranged in a triangular configuration; or a boat-like hull with high wings and stabilising tip floats or sponsons; or a boat-like hull fitted with low wings partly submerged at their roots and rising at a dihedral angle toward their tips; or a hull fitted with a hydrofoil connected to it by a strut or struts, such as that disclosed in U.S. Pat. No. 2,942,810.

All such combinations place conflicting demands upon the water supporting devices (hull, floats, etc.), and in several ways handicap the waterplane as an airplane. The most severe of these conflicts and handicaps include the following:

(a) Devices such as floats that are suitable for supporting weight by water displacement and for passing through water under minimum power usually are not suitable for supporting weight by high-speed planing. Further, when once planing, they tend to be affected by the viscous and surface tension characteristics of water in such a way as to inhibit their necessary separation from the water. A common phenomenon with waterplanes is that they are difficult to get airborne from still water, and in fact certain well known waterplanes under full load and full power are unable to lift off smooth water surfaces at all and the water must first be disturbed by the plane or by a power boat. This is one of the principal reasons why the transistion from buoyant support to airborne support is always difficult, requiring a good deal of excess power, and may at times be impossible.

(b) Water floatation devices tend to be complex in design, heavy and expensive in construction. A flying boat hull, for instance, has many important curved and angled surfaces typical of boats, all of which surfaces must be capable of withstanding water pounding at airplane take-off and landing speeds much higher than normal boat speeds, requiring complex and very strong internal structures. When floats or pontoons are used they impose a heavy aerodynamic drag on the airplane and cannot usually be concealed, as with wheels, and moreover necessitate elaborate and strong mounting provisions consisting of heavy, high-drag strut components.

(c) It is well known to use hydrofoils attached to a boat hull to reduce the power required for the hull to "plane" out of the water. Prior hydrofoil devices would impose undesirably high "g" forces upon the waterplane because of the substantially flat shape of the foils, which therefore enter the water all at once upon landing. This particular problem is avoided in the Hanning-Lee structure by arranging to have two longitudinally-spaced V-shaped hydrofoils, so that they enter and leave the water progressively, but such an arrangement has little or no inherent lateral stability, leaving the waterplane unstable around the axis during the transition from buoyant to foil-borne support, before sufficient speed has developed to render effective the waterplane's inherent airborne stability or the pilot control inputs.

U.S. Pat. No. 1,704,076 of E. R. Carroll discloses a biplane amphibian aeroplane that avoids the need for pontoons or the like by using the lower wing as the waterborne landing gear, the wing having a high dihedral and functioning as a corresponding hydrofoil. Such a wing must be sufficiently strong to withstand the stresses of contact with the water during take-off and landing at the corresponding speeds, so that a heavy structure is required. As the relatively large wing lifts progressively in the water there is a corresponding progressive shift toward the trailing edge of the hydrodynamic centre of pressure (lift) until it clears the water, when the aerodynamic centre of pressure will be established at its normal forward position, with the possibility of instability at this transition stage.

DEFINITION OF THE INVENTION

It is the principal object of the invention therefore to provide a new waterplane employing a new form of hydrofoil truss structure as the landing gear.

In accordance with the present invention there is provided a waterplane with sustaining wings for air flight comprising:

a waterplane body;

at least one pair of air flight wings mounted on the body so that when the waterplane is at rest in water their roots are at least partly immersed, the said wings being at dihedral angle such that they are both wholly out of the water at a point from 25% to 90% of one semi-span from the respective root;

a hydrofoil truss structure mounted on the body to extend below the body a vertical distance such that no other part of the waterplane can strike the water upon landing when the waterplane is at the landing angle of attack;

said hydrofoil truss structure being constituted by two transversely spaced primary hydrofoils terminating at respective outboard ends by respective intersections with the wings, their inboard ends and being lower than their outboard ends, being spaced from one another by a distance at least as great as the width of the waterplane body, and the said two primary hydrofoils being connected to one another by a connecting member horizontal, secondary surface-skimming hydrofoil, and two truss structure strut members each connected at one end to the waterplane body and at the other end at least adjacent to a respective junction of a primary hydrofoil inboard end with the said connecting member secondary hydrofoil, said primary and secondary hydrofoils having an area of from 1 to 10% of the said air flight wings, being disposed at a forward-opening angle to the water line at rest from $-3°$ to $+10°$, and having an angle of incidence greater by from 1° to 10° than the angle of incidence of said air flight wings, and said hydrofoil truss structure forming with the portions of the wings between the said intersections therewith of the primary hydrofoils a waterplane truss structure that is located longitudinally with respect to the waterplane length from about 20% of wing chord forward to about 20% of wing chord aft of the centre of gravity.

Thus, the new structure disclosed herein uses both the body and wings of the waterplane to provide stationary waterborne buoyancy and stability, while the hydrofoil truss structure mounted transversely of, and below, the waterplane body provides quick, stable transition to the planing state with safe management of the transition. The struts which can also be made part of the hydrofoil arrangement strengthen and lighten the waterplane structure and contribute to transition management and, once the waterplane is airborne, add to the normal lift required to sustain the waterplane in the air.

DESCRIPTION OF THE DRAWINGS

Particular preferred embodiments of the invention will now be described, by way of example, with reference to the accompanying diagrammatic drawings, wherein:

FIG. 2 is a plan view from below of the embodiment of FIG. 1,

DESCRIPTION OF THE PREFERRED EMBODIMENTS

Figure 1:
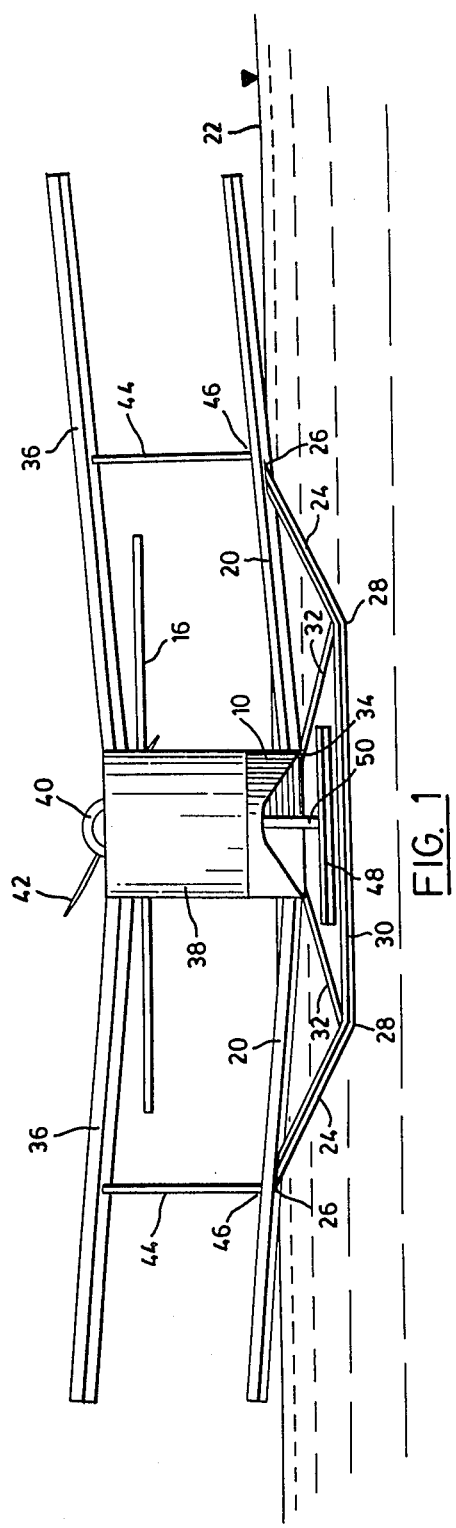
FIG. 1 is a head-on elevation of a first embodiment.

The first embodiment is an ultra-light water biplane of conventional body configuration, consisting of a light-weight boat hull 10 having a fixed fin portion 12 and controllable rudder portion 14, a fixed stabilizer 16 and controllable elevator 18.

The lower pair of wings 20 are fastened to the hull 10 in a position that ensures the root of each semi-span is submerged, or at least nearly so, the normal waterline being indicated by the line 22. The dihedral of the wings 20 is such that at least 10% of the semispan at the tip is clear of the water surface while at rest. It is required that both wings are wholly out of the water at a point from 25% to 90% of one semi-span from the respective root.

The waterplane landing gear of the invention consists of two primary hydrofoils 24 which are mounted transversely spaced from one another so that their outboard ends terminate at junctions 26 with the wings 20. Their inboard ends are lower than their outboard ends and are spaced from one another by a distance which is at least as great as the width of the waterplane body, these ends being connected at junctions 28 with a horizontal connecting member 30, which constitutes a secondary hydrofoil of the same cross-section profile as the primary hydrofoils 24. The truss is completed by two strut members 32 each connected at one end 34 to the waterplane body 10, and at the other end at least adjacent to the respective junction 28, and again preferably the two strut members 32 are of hydrofoil cross-section.

The plane is also provided with two upper wings 36 each connected at its root to the top of a cockpit enclosure 38, on which is mounted an engine 40 driving a pusher propeller 42. Interwing or interplane structs 44 are provided between each pair of lower and upper wings, the junction 46 of each strut 44 with the lower wing being closely adjacent to the respective junction 26. The landing gear is completed by a single horizontal tertiary hydrofoil 48 mounted at the nose of the aircraft by a vertical strut 50.

At rest in the water the functions of the various members are as follows:

The submerged portions of the lower wings 20 stabilize the aircraft against rolling (i.e. listing, tipping, or capsizing). Primary hydrofoils 24, in combination with the connector secondary hydrofoil 30, the struts 32 and the portions of the wings 20 between the roots and the junctions 26, fix the positions of the wings 20, the whole constituting a light, strong truss capable of resisting distorting stresses as from water movements while the plane is at rest. The nose hydrofoil 48 has no function at this time.

The interplane structs 44 transfer the positional stability and structural strength of the body and truss to the upper wings 36.

During acceleration from rest, the functions of the various members are as follows:

The submerged portions of the wings 20 function as part of the truss previously described, and initially continue as buoyant stabilizers around the longitudinal axis of the aircraft, as previously described. As speed increases and the primary hydrofoils 24 become effective they increasingly take over the wings' roll-stabilizing function and exert lift in the water by virtue of their positive angle of attack with respect to it, while continuing their function of positioning the wings 20 as members of a truss. The secondary hydrofoil 30 continues its function as a truss member and also contributes to water lift by virtue of its positive angle of attack to the water. The struts 32 continue their function as members of a truss and also contribute to water lift as for members 24 and 30.

The nose hydrofoil 48 is so angled and located as to ensure that the desired positive angle of attack of members 24, 30 and 32 is maintained. It does this in a manner entirely analogous to aerodynamic practice in obtaining longitudinal stability, which need not be recited here.

As the waterplane accelerates, there is a progressive transition from water-borne to hydrofoil-borne. The angles and disposition of the primary hydrofoils 24 are such that, during this critical phase when other controls are ineffective, their dihedral stabilizes the waterplane against rolling.

At some speed, the water lift generated is sufficient to bring all parts of the aircraft body 10 out of the water. The secondary hydrofoil 30 than acts as a surface-skimming hydrofoil, thereafter supporting the aircraft by planing on the surface of the water. The aircraft now has the attitude shown in FIG. 4 of the drawings. A surface-skimming hydrofoil at the air/water interface will align itself with the interface as much as possible, thus producing the required stability. During this phase acceleration toward takeoff speed continues; the functions of the various members during this phase are as follows:

The wings 20 continue their function as members of a truss. The primary hydrofoils 24 continue to function as members of a truss, additionally generating a small amount of aerodynamic lift. The secondary hydrofoil 30 continues functioning as a truss member and additionally provides surface-skimming planing support for most of the weight of the aircraft. The struts 32 continue as truss members and also contribute a small amount to aerodynamic lift.

Figure 4:
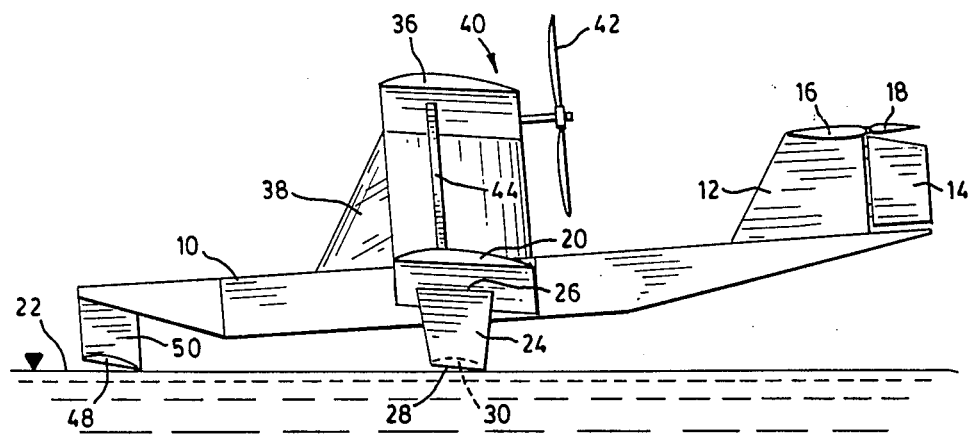
FIG. 4 is a side elevation similar to FIG. 3 and showing its attitude just prior to rotation for take-off.

The nose hydrofoil 48 maintains the aircraft in an attitude illustrated by FIG. 4 which minimizes aerodynamic drag in order to promote rapid acceleration toward takeoff speed, an attitude which is typically nosedown, placing the wings 20 and 36 at or near their angles of least total drag. It also gives planing support to some of the weight of the aircraft.

At a forward speed suitable to airborne flight, the aircraft is rotated around its pitch axis. This brings the wings 20 into a positive angle of attack to the air. At this stage, and thereafter until the aircraft again alights, the functions of the various members are as follows:

The wings 20 continue their function as members of a truss, and also generate lift sufficient to support the appropriate portion of the weight of the aircraft in air. The primary hydrofoils 32 continue to function as members of a truss and also contribute stability and aerodynamic lift proportional to their size, angle of attack, dihedral angle, etc. in conformance with known aerodynamic principles. The secondary hydrofoil 30 continues functioning as a member of a truss and further contributes to aerodynamic lift.

The tertiary nose hydrofoil 48 contributes its small but positive amount to aerodynamic lift as do the other hydrofoils and also to longitudinal stability in accordance with generally accepted aircraft stability principles.

The interplane struts 44 continue to perform the functions previously ascribed to them.

Figure 5:
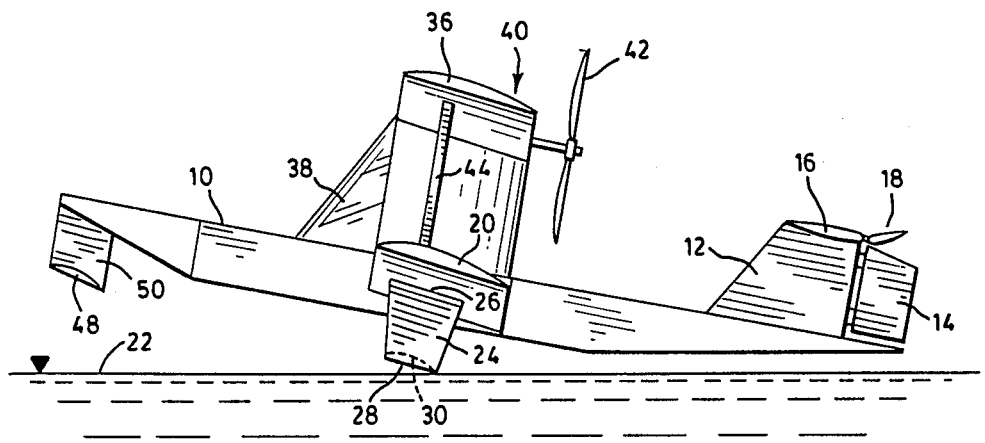
FIG. 5 is a side elevation similar to FIGS. 3 and 4 and showing its typical preferred attitude just before landing and FIG. 6 is a front end elevation similar to FIG. 1 of a second embodiment.

For landing the aircraft is brought down to water-level as much as possible in the attitude of FIG. 5, and touched down upon hydrofoil 30. Roll stability is provided during taxi-ing by the submerged wing roots. At least 25% of the length of each semi-span should be at least partly immersed in the water with the plane floating in order to provide this stability.

The primary hydrofoils 24 are designed with an area of from 1 to 10% of the said air flight wings, being disposed at a forward-opening angle to the water line at rest from $-3°$ to $+10°$, and having an angle of incidence greater by from $1°$ to $10°$ than the angle of incidence of the wings 20 and 36 together, and the resulting hydrofoil truss structure is located longitudinally with respect to the waterplane length from about 20% of wing chord forward to about 20% of wing chord aft of the centre of gravity. When the connecting member 30 is a secondary hydrofoil it has a cross-section and angle of incidence substantially similar to those of the primary hydrofoils, and said primary and secondary hydrofoils together having an area of from 1 to 10% of the wings 20 and 36 together. The preferred cross-section for all of the hydrofoils is one substantially similar to the aircraft section known as the Clark "Y".

Figure 3:
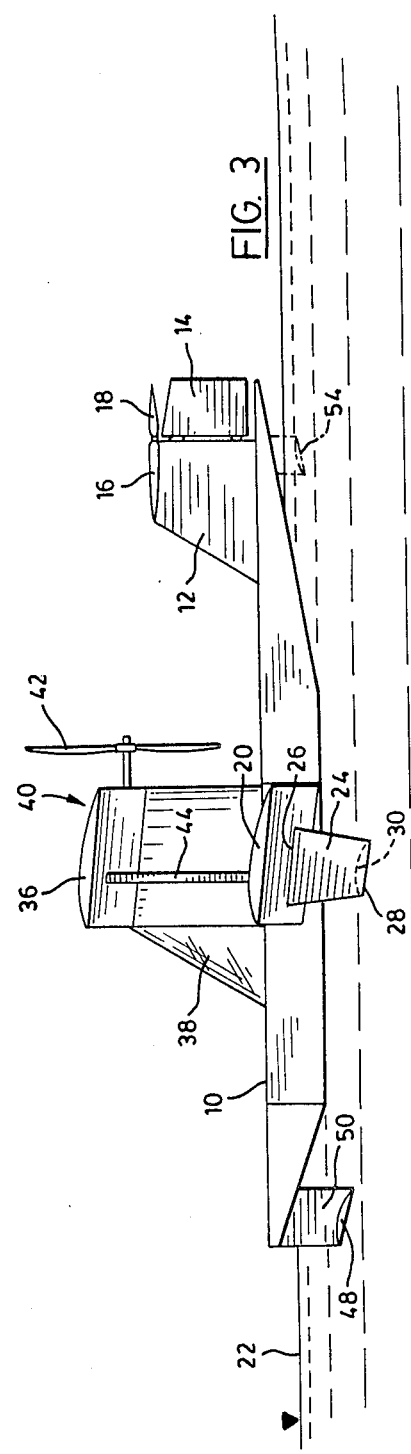
FIG. 3 is a side elevation of the embodiment showing its attitude, etc. when floating in the water.

The tertiary hydrofoil fitted at or adjacent to the nose will have an area from 10% to 50% of the hydrofoil area of the hydrofoil truss structure, having an angle of incidence from $1°$ to $10°$ greater than the hydrofoil truss structure, and extending below the waterplane body a distance such that the said air flight wings are brought to an angle of attack of $-5°$ to $+1°$ when the waterplane is hydroplaning on calm water supported only on the hydrofoil truss structure and the tertiary hydrofoil structure. Alternatively, a waterplane of the invention may be provided with a tertiary hydrofoil structure 54 fitted at or adjacent the tail, as illustrated in broken lines in FIG. 3, this hydrofoil having an area from 10% to 50% of the hydrofoil area of the hydrofoil truss structure, having an angle of incidence from $1°$ to $10°$ less than the hydrofoil truss structure, and extending below the waterplane body a distance such that it will not prevent rotation of the waterplane for take-off. Such a configuration, which omits the nose hydrofoil, corresponds to the conventional tail wheel configuration of land aircraft.

Neither of the nose or tail tertiary hydrofoils is absolutely necessary, the principal purpose of the nose hydrofoil is to prevent nose dig-in on a bad landing and also to provide the well-known advantages of a tricycle landing gear.

Figure 6:
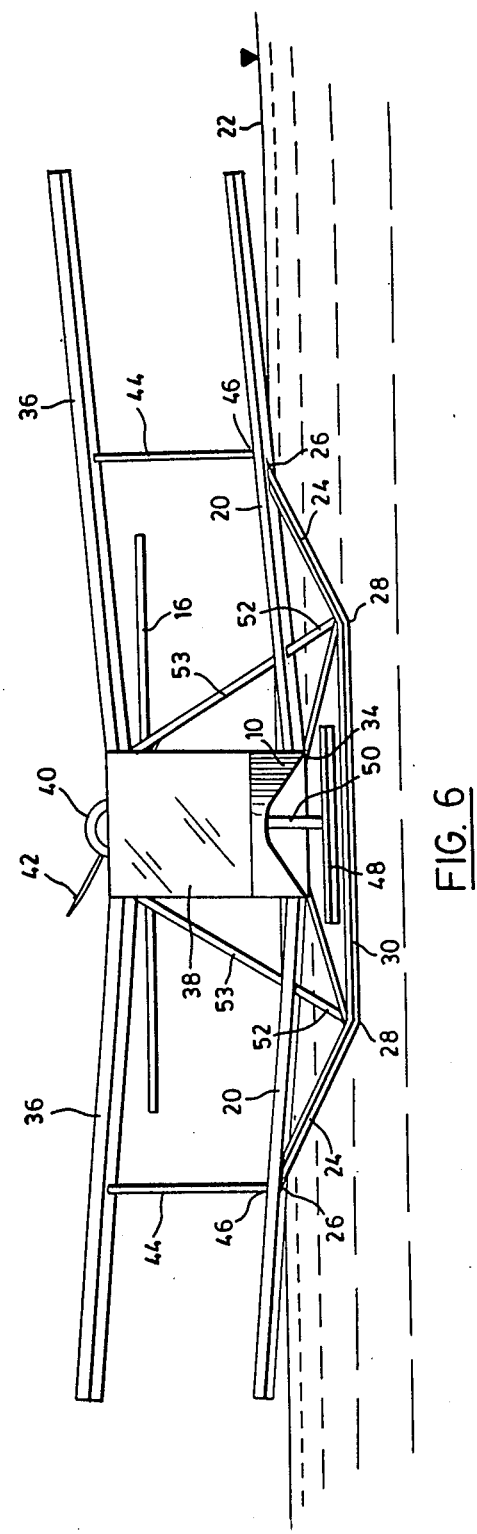

In the construction of FIG. 6 the truss is further strengthened by additional struts 52 which extend from the junctions 28 to the undersurfaces of the wings 20, and interplane struts 53 which are straight projections of the struts 52 from the top of the wings 20 to the junction of the roots of the wings 36 and the top of the frame of the cockpit 38. Such additional struts may be required with an ultra-light aircraft to provide a completely integrated truss structure.

I claim:

1. A waterplane with sustaining wings for air flight comprising:
   a waterplane body;

at least one pair of air flight wings mounted on the body so that when the waterplane is at rest in water their roots are at least partly immersed, the said wings being at dihedral angle such that they are both wholly out of the water at a point from 25% to 90% of one semi-span from the respective root;

a hydrofoil truss structure mounted on the body to extend below the body a vertical distance such that no other part of the waterplane can strike the water upon landing when the waterplane is at the landing angle of attack;

said hydrofoil truss structure being constituted by two transversely spaced primary hydrofoils terminating at respective outboard ends by respective intersections with the wings, their inboard ends being lower than their outboard ends, and being spaced from one another by a distance at least as great as the width of the waterplane body, the said two primary hydrofoils being connected to one another by a horizontal, secondary surface-skimming hydrofoil, and two truss structure strut members each connected at one end to the waterplane body and at the other end at least adjacent to a respective junction of a primary hydrofoil inboard end with the said secondary hydrofoil, said primary and secondary hydrofoils having an area of from 1 to 10% of the said air flight wings, being disposed at a forward-opening angle to the water line at rest from −3° to +10°, and having an angle of incidence greater by from 1° to 10° than the angle of incidence of said air flight wings, and said hydrofoil truss structure forming with the portions of the wings between the said intersections therewith of the primary hydrofoils a waterplane truss structure that is located longitudinally with respect to the waterplane length from about 20% of wing chord forward to about 20% of wing chord aft of the centre of gravity.

2. A waterplane as claimed in claim 1, wherein the said truss structure strut members are also of hydrofoil cross-section.

3. A waterplane as claimed in any one of claims 1 or 2, and comprising a tertiary hydrofoil structure fitted at or adjacent the nose thereof, the tertiary hydrofoil having an area from 10% to 50% of the hydrofoil area of the hydrofoil truss structure, having an angle of incidence from 1° to 10° greater than the hydrofoil truss structure, and extending below the waterplane body a distance such that the said air flight wings are brought to an angle of attack of −5° to +1° when the waterplane is hydroplaning on calm water supported only on the hydrofoil truss structure and the tertiary hydrofoil structure.

4. A waterplane as claimed in any one of claims 1 or 2, and comprising a tertiary hydrofoil structure fitted at or adjacent the tail thereof, the tertiary hydrofoil having an area from 10% to 50% of the hydrofoil area of the hydrofoil truss structure, having an angle of incidence from 1° to 10° less than the hydrofoil truss structure, and extending below the waterplane body a distance such that it will not prevent rotation of the waterplane for take-off.

5. A waterplane as claimed in any one of claims 1 or 2, and comprising a second pair of air flight wings mounted on the waterplane body higher than the first-mentioned pair of air flight wings, so that they are always operative in air, and also comprising respective interwing strut members between each first-mentioned wing and the respective second wing, each said interwing strut member being connected to the first-mentioned wing at least adjacent to the connection to the wing of the respective truss structure strut member.

6. A waterplane as claimed in any one of claims 1 or 2, wherein the cross-section of the hydrofoils is substantially similar to the aircraft section known as the Clark "Y".

* * * * *